United States Patent
Bacon (10) Patent No.: US 7,546,618 B2
(45) Date of Patent: Jun. 9, 2009

(54) LOWER-POWER STANDBY MODE FOR CONSUMER ELECTRONICS

(75) Inventor: Kinney C. Bacon, Lawrenceville, GA (US)

(73) Assignee: Scientific-Atlanta, Inc., Lawrenceville, GA (US)

(*) Notice: Subject to any disclaimer, the term of this patent is extended or adjusted under 35 U.S.C. 154(b) by 938 days.

(21) Appl. No.: 10/880,777

(22) Filed: Jun. 30, 2004

(65) Prior Publication Data

US 2006/0004661 A1  Jan. 5, 2006

(51) Int. Cl.
*H04N 7/173* (2006.01)
*H04N 7/16* (2006.01)
*H04N 7/167* (2006.01)
*G06F 1/32* (2006.01)

(52) U.S. Cl. .......................... 725/25; 725/31; 725/131; 725/133; 380/210; 380/211; 713/320; 713/321

(58) Field of Classification Search ............ 725/25, 725/31, 131, 133, 151, 152; 380/210, 211, 380/239, 277, 278; 348/460, 730; 713/320–324
See application file for complete search history.

(56) References Cited

U.S. PATENT DOCUMENTS

| | | | |
|---|---|---|---|
| 6,373,904 B1 * | 4/2002 | Sakamoto et al. | 375/316 |
| 6,430,290 B1 * | 8/2002 | Van Willigen et al. | 380/1 |
| 6,584,199 B1 * | 6/2003 | Kim et al. | 380/203 |
| 2004/0252833 A1 * | 12/2004 | Milner | 380/200 |
| 2005/0084106 A1 * | 4/2005 | Venema et al. | 380/239 |

OTHER PUBLICATIONS

Energy Star Qualifed Set-Top Boxes—Energy Efficiency Specifications U.S. Enviromental Protection Agency Sep. 6, 2000.

Society of Cable Telecommunicaitons Engineers, Inc.—Mar. 8, 1999 8 Page—SCTE DVS/223—Standby Power Management control for the Point of Deployment Module.

Society of Cable Telecommunications Engineers, Inc.—SCTE 40 2001 26 Page—Digital Cable Network Interface Standard SCTE Exton, PA U.S.

Society of Cable Telecommunications Engineers, Inc—SCTE 28, 2003 225 Page—HOST-POD Interface Standard SCTE Exton, PA. U.S.

Society of Cable Telecommunications Engineers, Inc.—SCTE 41 2003 74 Page—POD Copy Protection System SCTE Exton, PA. U.S.

* cited by examiner

*Primary Examiner*—John W. Miller
*Assistant Examiner*—John Schnurr
(74) *Attorney, Agent, or Firm*—Merchant & Gould (57) ABSTRACT

A conditional access device is provided. The conditional access device typically includes conditional access decryption, interface, timing and control logic. The conditional access decryption logic decrypts an incoming signal for use in a consumer electronics device in accordance with previously received entitlement management messages. The interface logic receives a control signal including an entitlement management message window from a headend control system through a receiver in the consumer electronics device. The timing logic asserts an awake signal responsive to the entitlement management message window becoming active. The control logic sends a request to the consumer electronic device to activate a receiver coupled to the headend control system in expectation of receiving an entitlement management message via the control signal in response to assertion of the awake signal. The control logic also communicates the entitlement management message to the conditional access decryption logic. Other systems and method are also provided.

45 Claims, 4 Drawing Sheets

LOWER-POWER STANDBY MODE FOR CONSUMER ELECTRONICS

TECHNICAL FIELD

The present disclosure is generally related to consumer electronics and, more particularly, is related to providing a low-power standby mode for consumer electronics.

BACKGROUND OF THE DISCLOSURE

The cable television industry has migrated to a digital television signal over the past several years. The digital television signal has myriad advantages over the traditional analog signal. These advantages typically include, among others, higher picture quality, more available channels, an addressed network, etc.

Another such advantage of the digital television signal is that the consumer can communicate with the headend service provider and add or remove a requested program/channel to or from the customer's subscription. In some systems, this is achieved from the headend control system by sending an entitlement management message (EMM) to the conditional access device at the customer's location. The conditional access device may be a point of deployment (POD) module, which is a personal computer card (PC Card, alternately PCMCIA) form factor that plugs into newer television models or set-top boxes. The EMM alerts the conditional access device that at least one channel has been added or removed from the customer's subscription, and the conditional access device adds or removes the channel(s) in response to the EMM. The EMM is typically encrypted to ensure that a user cannot change his/her subscriptions at the conditional access device. Because the EMM can come at any time, a receiver at the host must be powered and ready to receive the message.

However, current EnergyStar™ certification requirements for televisions necessitate that televisions in standby mode must use no more than 15 Watts of power. Moreover, 2.5 Watts of this power is allocated specifically for the conditional access device under the Host-POD Interface specification, specifically referenced in the standard for American National Standards Institute Society of Cable and Telecommunications Engineers (ANSI/SCTE) 28 2003. Consumer electronic manufacturers currently have a difficult time meeting this requirement. Thus, there exists a heretofore unaddressed need in the industry.

BRIEF DESCRIPTION OF THE DRAWINGS

The invention can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE DISCLOSURE

The embodiments of the disclosure now will be described more fully hereinafter with reference to the accompanying drawings, in which preferred embodiments of the disclosure are shown. The disclosure may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

Figure 1:
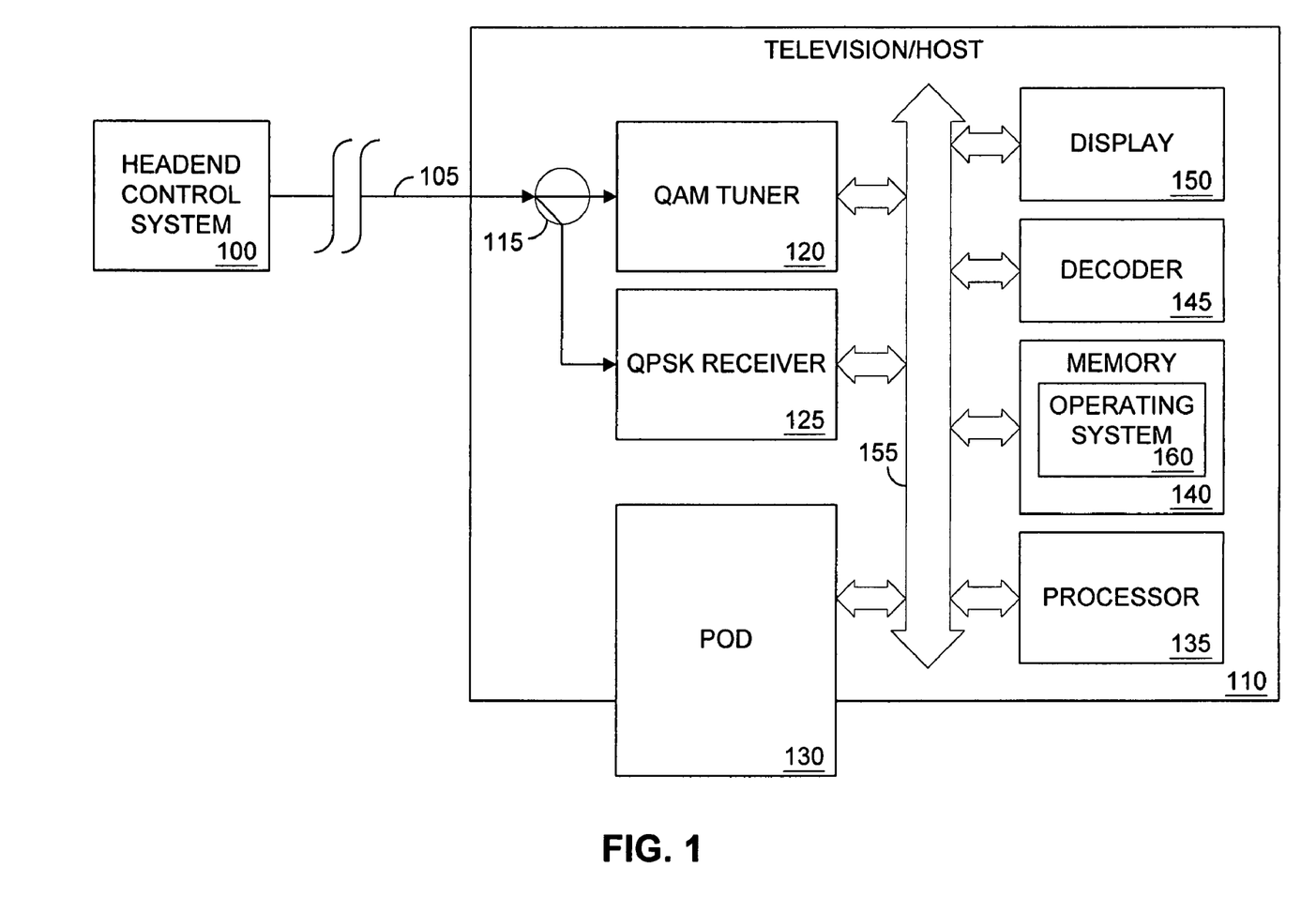
FIG. 1 is a block diagram illustrating an embodiment, among others, of a cable headend and client device as would exist in a cable distribution system.

Referring now to FIG. 1, shown is a block diagram illustrating an embodiment, among others, of a cable headend and client device. As one skilled in the art should recognize, the cable digital transport signal, which includes a multitude of audio/video programs, is transmitted by the headend control system 100. The cable digital transport signal is then typically sent via a distribution system 105 to a customer premise consumer electronic device, which may be a digital cable-ready television 110, among others. Generally, in terms of hardware, in some embodiments, among others, the television 110 includes a splitter 115, a quadrature amplitude modulation (QAM) tuner 120, a quadrature phase shift key (QPSK) receiver 125, a point-of-deployment (POD) module 130, a processor 135, a memory 140, a decoder 145, and a display 150. The television further includes a local interface 155 which communicatively couples each of the components 120-150 together. The local interface 155 can be, for example but not limited to, one or more buses or other wired or wireless connections, as is known in the art. The local interface 155 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 135 is a hardware device for executing software, particularly that stored in memory 140. The processor 135 can be any custom made or commercially available processor, a central processing unit (CPU), an auxiliary processor among several processors, a semiconductor based microprocessor (in the form of a microchip or chip set), a macroprocessor, or generally any device for executing software instructions.

The memory 140 in various embodiments, among others, includes any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 140 can incorporate electronic, magnetic, optical, and/or other types of storage media. Note that the memory 140 in some embodiments, among others, has a distributed architecture, where various components are situated remote from one another, but are accessible by the processor 135.

The software in memory 140 typically includes one or more separate programs 160, each of which comprises an ordered listing of executable instructions for implementing logical functions. In the example of FIG. 1, the software in the memory 140 includes a suitable operating system (O/S) 160. The operating system 160 essentially controls the execution of other computer programs, and provides scheduling, input-output control, memory management, and communication control and related services.

When the television 110 is in operation, the processor 135 is configured to execute software stored within the memory 140, to communicate data to and from the memory 140, and to generally control operations of the television 110 pursuant to the software. The O/S 160, in whole or in part, but typically the latter, are read by the processor 135, perhaps buffered within the processor 135, and then executed.

The memory 140 further includes other programs (not shown) which, in some implementations, among others, are embodied in any computer-readable medium for use by or in connection with an instruction execution system, apparatus, or device, such as a computer-based system, processor-containing system, or other system that is operable to fetch the instructions from the instruction execution system, apparatus, or device and execute the instructions. In the context of this document, a "computer-readable medium" is any means that is operable to store, communicate, propagate, or transport the program for use by or in connection with the instruction execution system, apparatus, or device. The computer readable medium in various implementations, among others, is, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that in some embodiments, among others, the computer-readable medium is paper or another suitable medium upon which the program is printed, as the program can be electronically captured, via for instance optical scanning of the paper or other medium, then compiled, interpreted or otherwise processed in a suitable manner if necessary, and then stored in a computer memory.

The splitter 115, as known to those skilled in the art, divides the incoming signal received from the headend control system 100. The divided signal is then distributed to the QAM tuner 120 and the QPSK receiver 125. The QAM tuner 120 typically operates to filter a wanted signal from a signal containing numerous transmitted signals. This wanted signal is a digital transport stream that includes the desired encrypted audio and video signal. The QPSK receiver operates to receive a data signal that is an out-of-band signal from the headend control system 100. This data signal is a control signal for the POD module 130. Those skilled in the art should understand that a QAM tuner is described because existing television standards use quadrature amplitude modulation for the digital transport stream in a cable system. However, it should be recognized that this disclosure is not intended to be limited to QAM tuners. Moreover, it should also be recognized that in various embodiments, among others, of the present disclosure the receiver 125 uses standards other than QPSK for modulating the control signal.

The POD module 130, is a conditional access device. Typically, conditional access devices, such as a POD module 130, receive the demodulated digital transport stream from the QAM tuner after demodulation (not shown) and decrypt the requested audio/video in the digital transport stream in accordance with conditional access to programming which has been granted via the control signal. As those skilled in the art should recognize, the control signal is typically called an entitlement management message (EMM). The POD device 130 typically communicates with the television using the Host-POD Interface specification as described in ANSI/SCTE 28 203, which is hereby entirely incorporated by reference. As noted above, the POD device 130 is typically a PC card form factor (PCMCIA card form factor) and plugs into the television through a PCMCIA connector. However, those skilled in the art should recognize that the POD device 130 could alternatively be inserted into a set-top box or the functionality of the POD device 130 could be included within a set-top box. In such an embodiment, among others, the QPSK receiver and QAM tuner functionality would typically be moved into the set-top box.

The decoder 145 typically decodes the descrambled signal from the POD device 130. As known to those skilled in the art, the decoder 145 takes an encoded signal such as MPEG, or another encoding standard, and decodes the signal to produce a signal that can be displayed on the television display 150. Those skilled in the art should understand that there exist myriad encoding/decoding and display technologies, and that each such technology is intended to be included within the scope of the present disclosure. Furthermore, although a hardware decoder is shown in FIG. 1, in alternative embodiments, among others, the decoder 145 is a software solution which resides in memory and is executed by the processor, as known to those skilled in the art.

Figure 2:
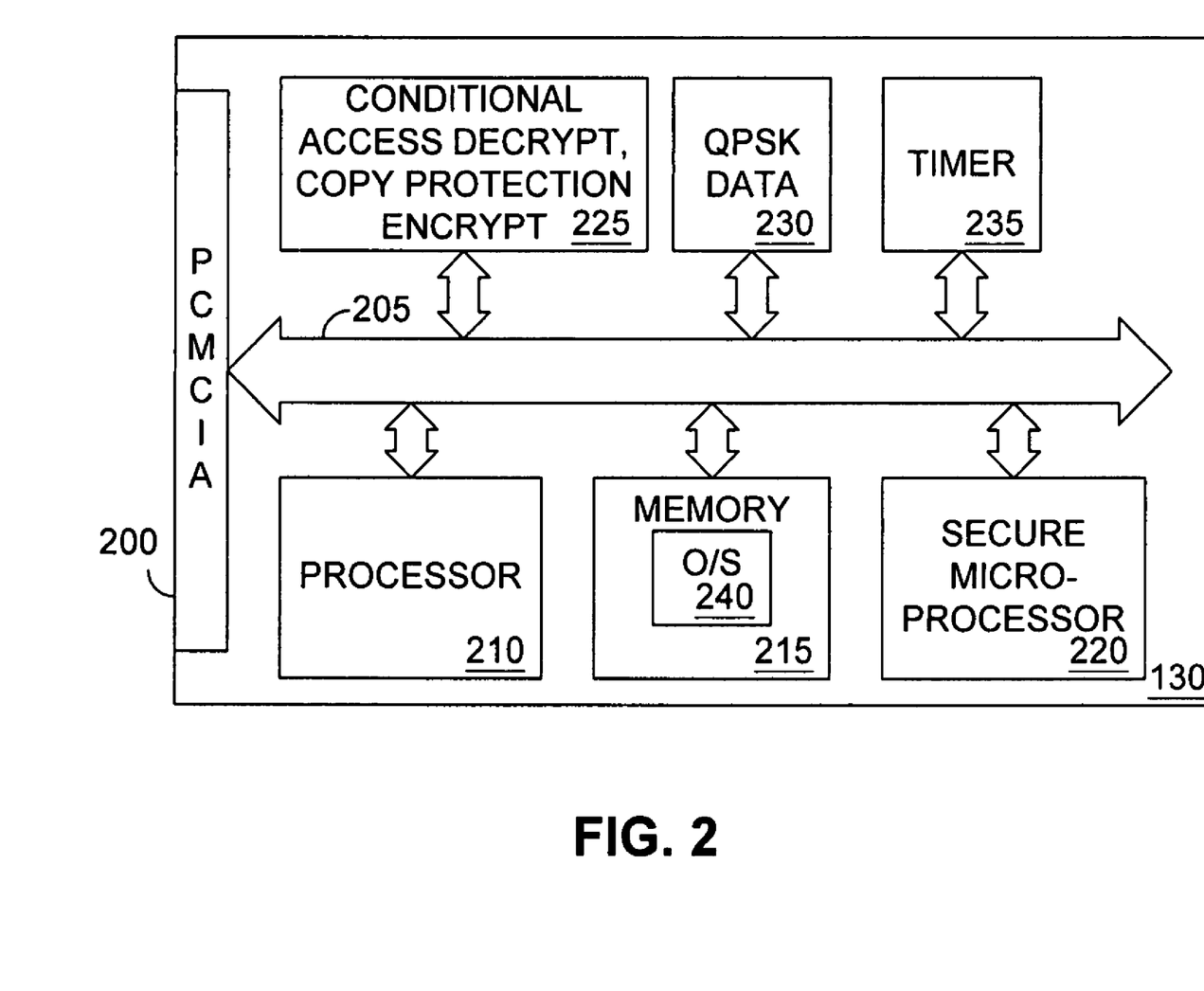
FIG. 2 is a block diagram illustrating an embodiment, among others, of the POD module of the client device of FIG. 1.

Referring now to FIG. 2, shown is a block diagram illustrating an embodiment, among others, of the POD module 130 of the cable distribution system of FIG. 1. The POD module 130 typically includes a PCMCIA interface 200, as modified per the POD-Host Interface specification, ANSI/SCTE 28 2003, which is hereby entirely incorporated by reference. The PCMCIA interface 200 enables the POD module 130 to communicate with the television 110 (FIG. 1). However, those skilled in the art should recognize that the PCMCIA interface is described merely because it is a widely used standard in the industry, and that it is intended that the disclosure include any other of a plethora of interfaces which could be used.

The PCMCIA interface 200 is coupled to a local interface 205 which communicatively couples the PCMCIA interface to each of the components of the POD module 130, such as the processor 210, memory 215, secure microprocessor 220, conditional access decryption and copy protect encryption logic 225, a QPSK data interface 230, and a timer 235, among others. The local interface 205 can be, for example but not limited to, one or more buses or other wired or wireless connections, as is known in the art. The local interface 205 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 210 is a hardware device for executing software, particularly that stored in memory 215. The processor 210 can be any custom made or commercially available processor, a central processing unit (CPU), an auxiliary processor among several processors, a semiconductor based microprocessor (in the form of a microchip or chip set), a macroprocessor, or generally any device for executing software instructions.

The memory 215 in various embodiments, among others, includes any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 215 can incorporate electronic, magnetic, optical, and/or other types of storage media. Note that the memory 215 in some embodiments, among others, has a distributed architecture, where various components are situated remote from one another, but are accessible by the processor 210.

The software in memory 215 typically includes one or more separate programs 240, each of which comprises an ordered listing of executable instructions for implementing logical functions. In the example of FIG. 1, the software in the memory 215 includes a suitable operating system (O/S) 240. The operating system 240 essentially controls the execution of other computer programs, and provides scheduling, input-output control, memory management, and communication control and related services.

When the POD module 130 is in operation, the processor 210 is configured to execute software stored within the memory 215, to communicate data to and from the memory 215, and to generally control operations of the POD module 130 pursuant to the software. The O/S 240, in whole or in part, but typically the latter, are read by the processor 210, perhaps buffered within the processor 210, and then executed.

The memory 215 further includes other programs (not shown) which, in some implementations, among others, are embodied in any computer-readable medium for use by or in connection with an instruction execution system, apparatus, or device, such as a computer-based system, processor-containing system, or other system that is operable to fetch the instructions from the instruction execution system, apparatus, or device and execute the instructions. Again, in the context of this document, a "computer-readable medium" is any means that is operable to store, communicate, propagate, or transport the program for use by or in connection with the instruction execution system, apparatus, or device. The computer readable medium in various implementations, among others, is, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that in some embodiments, among others, the computer-readable medium is paper or another suitable medium upon which the program is printed, as the program can be electronically captured, via for instance optical scanning of the paper or other medium, then compiled, interpreted or otherwise processed in a suitable manner if necessary, and then stored in a computer memory.

The secure microprocessor 220 in the POD module 130 is typically used for secure conditional access processing. The secure microprocessor 220 is configured to receive EMMs and to process the EMMs to discover a multi-session key (MSK) using a secret serial number which is programmed inside of the secure microprocessor 220, as known to those skilled in the art. The MSK is then stored within the secure microprocessor 220 such that accessibility of the MSK is reduced to hinder tampering. Moreover, the secure microprocessor 220 is further operable to process entitlement control messages (ECMs) and to release a control word to the conditional access decryption logic 225 such that the incoming signal may be decrypted.

With regard to the conditional access decryption and copy protect encryption component 225, this component 225 is operable to decrypt the desired audio and video signals within the digital transport stream and, if copy protection is required, encrypt the signals for copy protection as defined in ANSI/ SCTE 41 2003, which is hereby entirely incorporated by reference. Moreover, as known to those skilled in the art, this component 225 in various embodiments, among others, of the present disclosure can be implemented in hardware or software, or a combination thereof.

The QPSK data interface 230 is operable to provide an interface for the QPSK data received via the QPSK receiver. The QPSK data interface 230 allows the POD module 130 to receive data regardless of whether the host device 110 is tuned to an analog or digital channel. And, as known to those skilled in the art, the EMM may be transmitted over the QPSK data signal.

In an embodiment, among others, of the present disclosure the headend control system alerts the POD module 130 to a message window. The message window defines a time period during which the POD module 130 should expect to receive entitlement management messages. To this end, the POD module includes a timer 235, in various embodiments, among others, of the present disclosure which can be implemented in hardware or software, or any combination thereof. The function of the timer 235 is to track the message window received from the headend control system 100 (FIG. 1). When the message window becomes active (e.g. the time during which the headend control system 100 (FIG. 1) has alerted the POD module 130 that it will be sending messages), the timer 235 alerts the processor 210 by asserting a wake signal.

Upon receiving the asserted wake signal from the timer, the processor 210 sends an interrupt to the television processor 135 (FIG. 1). The interrupt signal alerts the television processor 135 (FIG. 1) that the QPSK receiver 125 (FIG. 1) should be powered-up.

As one skilled in the art should recognize, if the television processor 135 (FIG. 1) senses that the television 110 (FIG. 1) is not in standby mode, the QPSK receiver 125 (FIG. 1) is already powered up. The television processor 135 (FIG. 1) in this instance would ensure that the QPSK receiver 125 (FIG. 1) remain powered up regardless of whether a user requests the television be put into standby mode. It should be recognized, however, that in various embodiments, among others, of the present disclosure, when the user requests the television be put in standby mode, the other functionality of the television is put into standby mode, while the QPSK receiver 125 remains powered-up. Moreover, it should also be recognized, that in various embodiments, among others, of the present disclosure, the POD module 130 may sense that the television is in a powered state when the wake signal is asserted. The POD processor 210, therefore, does not send an interrupt unless the television is put in standby mode during the message window.

At the conclusion of the message window, the timer 235 de-asserts the wake signal. The POD processor 210 senses the de-assertion of the wake signal, and sends a second interrupt request to the television processor 135. The television processor 135 receives the second interrupt request, and determines that the QPSK receiver 125 can be powered-down/ deactivated. Those skilled in the art should recognize that when the television 110 is not in standby mode, the television processor 135 would typically ignore the second interrupt request, and keep the QPSK receiver 125 power-up until the user requests to put the television 110 is standby mode.

It should be recognized that the above system describes establishing a determinate message window for receiving entitlement management messages from the headend control system. This determinate time window reduces the problem of powering the QPSK receiver 125 constantly, thereby reducing inefficiencies of the system. The message window in various embodiments, among others, of the present disclosure is received from the headend control system 100. In some embodiments, among others, of the present disclosure the message window is received along with each successive EMM. Moreover, in this embodiment, among others, the headend control system could induce randomness into the message windows to help prevent circumvention of the EMM receipt. For example, a user could bypass the EMM receipt if the messages are sent at regular time intervals by installing a bypass switch with a timer having the same period as the POD timer 235. Thus the user could subscribe to all services, get the first EMM authorizing all services, then cancel all of the services and use a bypass switch so that the EMM canceling services is not received. However, if the user does not know when the next EMM will be received, bypassing the next EMM becomes more difficult.

In alternative embodiments, among others, of the present disclosure the headend control system could use a random or pseudo-random algorithm to vary the interval between control message windows. One such method would be to use a hopping algorithm similar to frequency hopping. However, instead of hopping between frequencies, the system would be hopping between time intervals. Alternatively, the system could also use a product of the previous message window (or some other known value) and the MSK to determine the time of a next message window. Those skilled in the art will understand that there exist myriad algorithms for introducing random or pseudo-random qualities into a communications system, and that each such algorithm is intended to be included within the scope of the present disclosure.

Alternative embodiments, among others, of the present disclosure also include a counter (not shown) which counts successive message windows during which an EMM is not received. If these successive message windows reach a certain threshold (e.g. three successive message windows), a disable signal is asserted. The POD processor 210, upon sensing the disable signal could deactivate the functionality of the POD module 130. Thus, further programming cannot be decrypted/descrambled by the POD module 130. Upon receiving an EMM while the disable signal is activated, the counter would reset and de-assert the disable signal. The processor 210 would then enable the decryption/descrambling capability of the POD module 130. Thus, any bypass of the control messages (EMMs) would disable the POD module, which would also help to prevent tampering.

Figure 3:
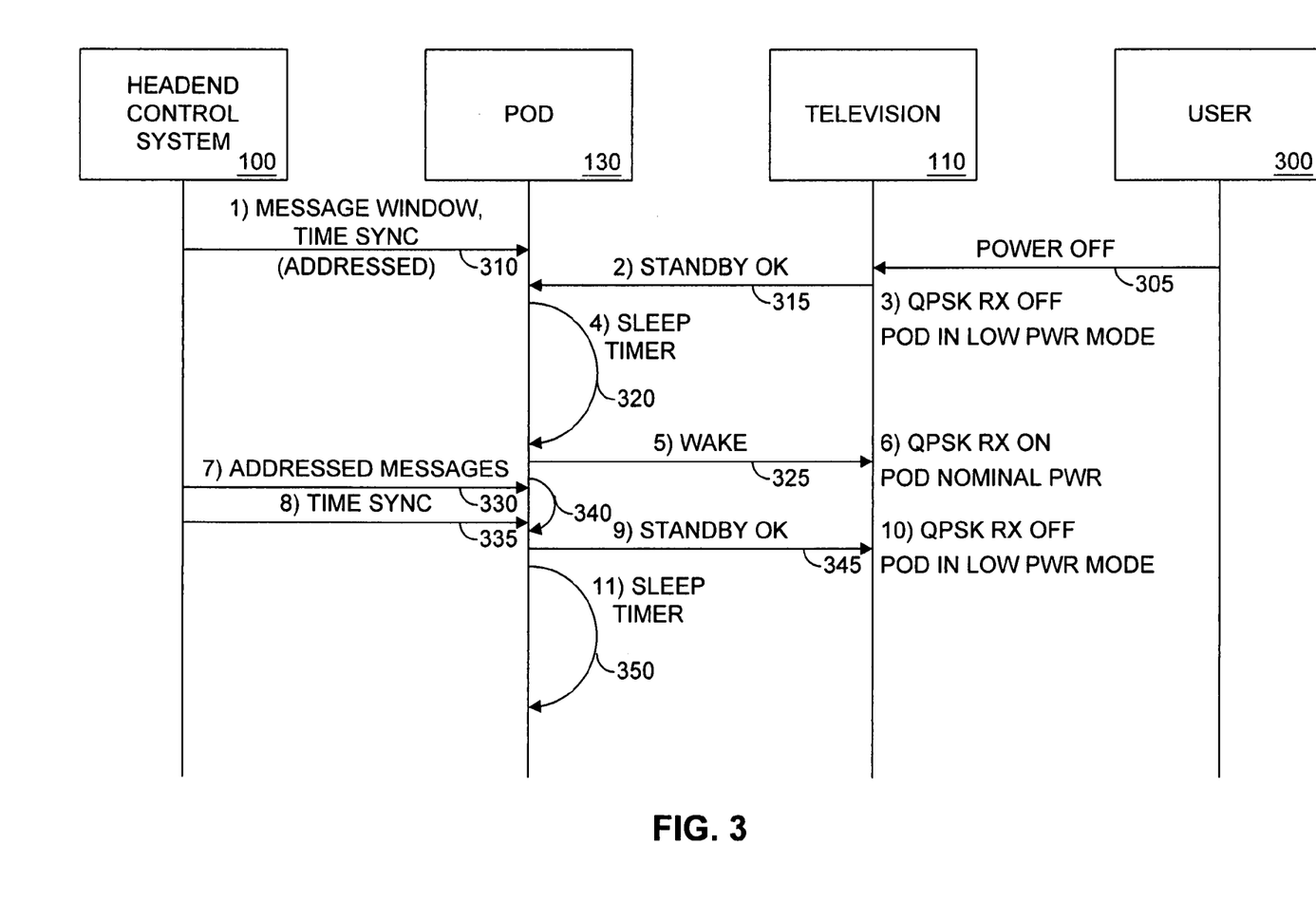
FIG. 3 is a sequence diagram illustrating the flow of an embodiment, among others, of the client device of FIG. 1.

Referring now to FIG. 3, shown is a sequence diagram illustrating the flow of an embodiment, among others, of the cable distribution system of FIG. 1. It should be noted, as described above, the most common embodiment, among others, of the present disclosure uses a television in standby mode. Thus, a user 300 will typically request the television be put into standby mode at some point before the message window becomes active, as shown in step 305. Those skilled in the art should recognize that in most consumer electronic televisions, standby is a low-power mode but power is still available to some functions, such as the infrared remote control.

In a first step toward establishing a determinate time period for sending control messages, the headend control system 100 sends a message window time and a time sync message to the POD module 130, as shown in step 310. The message window time will describe a period of time during which the POD module 130 can expect to receive an EMM, thereby reducing the average power consumed by the television 110 and POD module 130. The time sync message will help to ensure that the timer 235 (FIG. 2) of the POD module 130 asserts the wake signal to activate the QPSK receiver 125 at the correct time.

At some point between the receipt of the message window and the assertion of the wake signal, the user 300 puts the television 110 into standby mode, as shown in step 305. The television then notifies the POD module 130 that the television is in standby mode, as shown in step 315. When the television 110 goes into standby mode, the QPSK receiver 125 is turned off, and the POD module 130 is requested to enter a low power state (sleep mode).

As shown by step 320, the POD module 130 tracks the amount of time until the next message window. As described above, this is typically accomplished by using a timer 235 to notify the POD module 130 processor 210 when the message window become active. Upon sensing that the message window has become active, the POD module 130 sends in interrupt request to the television 110 to wake up the QPSK receiver 125, as shown in step 325. The television 110 then powers-up the QPSK receiver 125, and the POD module 130 operates at nominal power.

Typically, the POD module 130 would then receive messages (typically EMM) via the QPSK receiver 125, as shown in step 330. However, it should be recognized that the headend control system 100 may not have a message for the POD module 130, and thus, an EMM may not be received in some embodiments, among others, of the present disclosure. Furthermore, the headend control system 100 in various embodiments, among others, of the present disclosure can provide a new time sync to the POD module 130. However, those skilled in the art should recognize that the POD module (alternatively a set-top box) is typically accurate to within a few seconds over a one week period, and therefore, it is not necessary to send a time sync message during every message window.

The POD module continues to be ready to receive EMMs during the course of the entire message window, as shown by step 340. The timer 235 continues to determine whether the message window is active, and de-asserts the wake signal when the message window ends. At this point, the POD module 130 notifies the television that the message window has ended and that the television can go back into full standby mode, as shown in step 345. The television then powers-down the QPSK receiver 125, and the POD module 130 goes into low power mode (sleep). The POD module then continues to track when the next message window will become active, as shown in step 350. The steps in the sequence would then repeat upon the next message window becoming active.

In alternative embodiments, among others, of the present disclosure, the POD module 130 is operable to send an interrupt request signal to the television processor 135 upon receiving an EMM. The interrupt request signal would instruct the television processor to power-down the QPSK receiver 125. Thus, the QPSK receiver then shuts down after receiving the scheduled EMM for the message window. However, one skilled in the art should understand that such an embodiment would limit the headend control system to sending a single EMM during the message window, thus delaying further control messages until the next message window. It should also be noted, though, that a digital network control system (DNCS) is typically operable to send EMM messages at a shortened periodic interval upon receiving a programming change request from the user. Thus, when the television is fully powered (e.g. not in standby mode), the QPSK receiver 125 in the television would be fully powered and ready to receive the more regular EMM updates. Therefore, the POD module 130 would typically be ready to receive the updated EMM before the next message window becomes active, obviating some of the problems associated with receiving a single EMM per message window.

Figure 4:
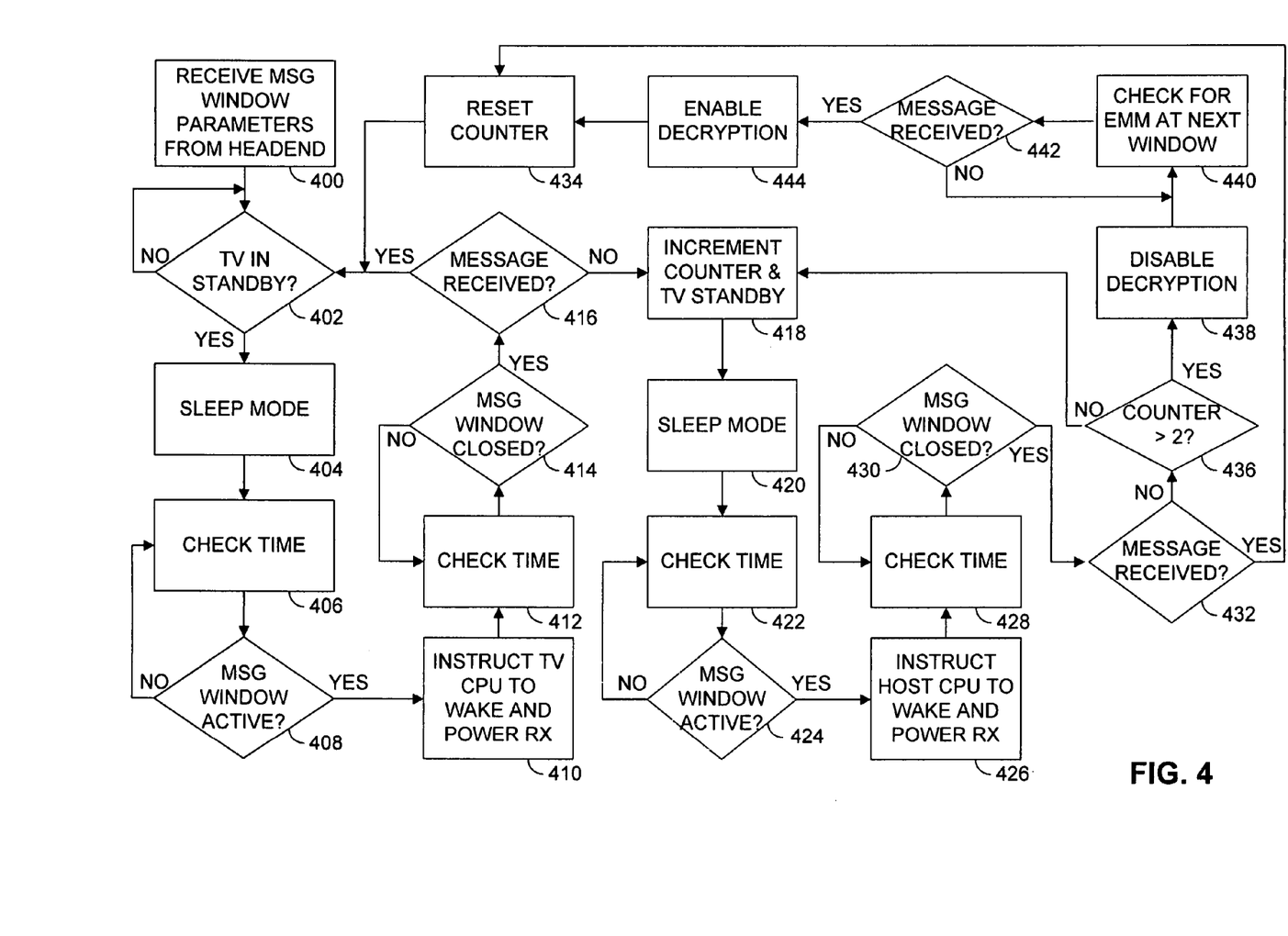
FIG. 4 is a flowchart illustrating the flow of an embodiment, among others, of the POD module of FIG. 2.

Referring now to FIG. 4, shown is a flowchart illustrating the flow of an embodiment, among others, of the POD module 130 of FIG. 2. In step 400, the POD module 130 (FIG. 2) receives a set of message window parameters from the head-end control system 100 (FIG. 1). The POD module 130 then receives a signal from the television processor 135 notifying the POD module that the television has entered to standby mode, as shown in step 402. Otherwise the POD module 130 waits for notification from the television processor 135 that the television 110 has entered standby mode, as shown in step 402. The POD module 130 then puts itself into sleep mode, as shown in step 404. In step 406, the POD module 130 checks the time. The POD module 130 then determines whether the message window is active in accordance with step 408. If the message window is not active, the POD module returns to check the time again, in accordance with step 406, and continues to do so until the message window becomes active.

When the message window becomes active the POD module 130 instructs the television processor 135 to wake and power the QPSK receiver 125, as shown in step 410. The POD module 130 then checks the time as shown in step 412. If the message window has not closed, as shown in step 414, the POD module returns to step 412 to check the time again. However, if the message window has closed, as shown in step 414, the POD module checks to determine whether a control message (EMM) was received in step 416. If a control message was received, the POD module 130 returns to step 402 and instructs the television processor 135 to return to standby mode by shutting down the QPSK receiver. The process then repeats for the next message window.

However, if no control message was received, the POD module 130 increments a counter and sends an interrupt to the television 110 as shown in step 418. The interrupt tells the television processor 135 to turn off the QPSK receiver 125. The POD module 130 then goes into sleep mode, as shown in step 420. While in sleep mode, the POD module 130 checks the time, in accordance with step 422. If the message window is not active, as shown in step 424, the POD module continues to check the time, as shown in step 422. When the message window becomes active, the POD module 130 sends an interrupt to the television processor 135 alerting the processor 135 to wake and power the QPSK receiver 125, as shown in step 426.

The POD module then checks the time in accordance with step 428. If the message window remains active, as shown in step 430, the POD module 130 returns to step 428 and checks the time until the message window closes. When the message window closes the POD modules checks to determine whether a message (EMM) was received, as shown in step 432. If there was a message received, the counter is reset in step 434. The POD module 130 then returns to step 402 and instructs the television processor 135 to return to standby mode, turning off the QPSK receiver 125.

If there was no message received in step 432, the POD module 130 determines whether the counter value is greater than two (more than three successive message periods without receiving a message), for example, among others, as shown in step 436. If the counter value is not greater than two, the POD module 130 returns to step 418, and increments the counter value. After three successive message windows without receiving a message, the decryption logic 225 is disabled by the POD module 130 in step 438. The POD module 130 then checks for an EMM at the next window. One skilled in the art should understand that in various embodiments, among others, of the present disclosure, the POD module 130 holds the last message window open until an EMM is received. However, the POD module 130 in some embodiments, among others, instructs the television processor 135 to power-down the QPSK receiver 125, until the POD module requests the QPSK receiver be powered-up for the next message window. Returning to step 442, if no EMM is received, the POD module 130 returns to step 440 and checks for an EMM at the next window.

Upon receiving an EMM, the POD module 130 enables the decryption logic as shown in step 444. The decryption logic then begins to provide the decoder 145 with a descrambled picture again. The counter is then reset as shown in step 434. The POD module then returns to step 402, and instructs the television processor 135 to return to standby mode, by powering down the QPSK receiver 135.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should also be emphasized that the above-described embodiments of the present disclosure are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

Therefore, having thus described the invention, at least the following is claimed:

1. A conditional access device, comprising:
   a conditional access decryption unit operable to decrypt an incoming signal for use in a consumer electronics device in accordance with at least one previously received entitlement management message;
   an interface unit operable to receive a control signal including a message window from a headend control system via a receiver in the consumer electronics device, wherein the message window defines a time interval for expected reception of an entitlement management message;
   a timing unit operable to receive the message window from the interface unit, to assert an awake signal responsive to determining that the message window is active representing occurrence of the time interval, and to disable the awake signal responsive to determining that the message window is inactive representing expiration of the time interval; and a hardware control unit operable to send requests to the consumer electronics device to activate the receiver coupled to the headend control system in expectation of receiving the entitlement management message in response to the assertion of the awake signal, and to deactivate the receiver in response to disablement of the awake signal, the control unit is further operable to communicate the entitlement management message to the conditional access decryption unit.

2. The conditional access device of claim 1, further comprising:

an unauthorized bypass unit operable to disable the conditional access decryption unit responsive to not receiving the entitlement management message for a period of time.

3. The conditional access device of claim 2, wherein the unauthorized bypass unit is further operable to enable the conditional access decryption unit responsive to receiving the entitlement management message.

4. The conditional access device of claim 2, wherein the unauthorized bypass unit disables the conditional access decryption unit after a plurality of successive message windows without receiving at least one entitlement management message.

5. The conditional access device of claim 1, wherein the conditional access device operates according to an ANSI/SCTE 28 2003 Host-POD Interface specification.

6. The conditional access device of claim 1, wherein a next message window is received with a new entitlement management message.

7. The conditional access device of claim 1, wherein the message window occurs at irregular intervals.

8. The conditional access device of claim 1, wherein the headend control system comprises:

a distribution network coupling the headend control system to a customer premise containing the consumer electronics device;

a content server operable to provide the distribution network with an encrypted audio/video signal; and a control system operable to provide entitlement management messages to the customer premise during a plurality of message windows.

9. The conditional access device of claim 8, wherein the headend control system comprises an entitlement management message server operable to send an addressed entitlement management message to the customer premise.

10. The conditional access device of claim 9, wherein the entitlement management message server is further operable to send the message window comprising a period of time during which the entitlement management message server will send the entitlement management message to the customer premise.

11. The conditional access device of claim 9, wherein the entitlement management message server is further operable to send a plurality of entitlement management messages at determinate irregular intervals responsive to a random or pseudo-random algorithm known to customer premise equipment including the conditional access device.

12. The conditional access device of claim 10, wherein the entitlement management message server sends the message window to the customer premise while the message window is active.

13. The conditional access device of claim 1, wherein the consumer electronics device includes a low-power standby mode, and comprises:

a tuner operable to receive a digital transport stream signal which includes audio and video programs from the headend control system and filter the digital transport stream signal to produce a tuned signal;

the receiver operable to receive a control signal from the headend control system, the control signal comprising conditional access information;

an interface operable to supply the conditional access device with the tuned signal and receive a decrypted signal, the interface being further operable to supply the conditional access device with the conditional access information and receive the requests in the form of interrupt signals from the conditional access device; and a processor operable to instruct the receiver to power-down and power-up responsive to receiving the interrupt signals from the conditional access device via the interface.

14. The conditional access device of claim 13, wherein the processor is operable to instruct the receiver to power-down while the consumer electronics device is in a standby mode, and to instruct the receiver to power-up responsive to the interrupt signal received from the conditional access device via the interface.

15. The conditional access device of claim 13, wherein the consumer electronics device further comprises:

a decoder operable to receive the decrypted signal and provide a decoded signal; and a display operable to receive the decoded signal and display the decoded signal to a user.

16. The conditional access device of claim 13, wherein the conditional access decryption unit receives the tuned signal and provides a decrypted signal responsive to the tuned signal, and wherein the request to activate the receiver is in the form of a first interrupt to the processor responsive to the message window being active, the first interrupt comprising requesting power to the receiver.

17. The conditional access device of claim 16, wherein the request to deactivate the receiver is in the form of a second interrupt to the processor responsive to the message window becoming inactive, the second interrupt requesting the receiver be powered-down.

18. The conditional access device of claim 14, wherein the consumer electronics device operates at low-power while in the standby mode.

19. A method of establishing a determinate period for control messages, the method comprising:

receiving at a conditional access device notification of a message window from a receiver in a consumer electronics device coupled to a headend control system, wherein the message window defines a time interval for expected reception of an entitlement management message;

determining at the conditional access device that the message window is active representing occurrence of the time interval;

sending a first interrupt request from the conditional access device to the consumer electronics device to activate the receiver responsive to determining that the message window is active;

waiting for the entitlement management message to be received for the duration of the time interval; and sending a second interrupt request from the conditional access device to the consumer electronics device to deactivate the receiver in response to expiration of the time interval.

20. The method of claim 19, further comprising:
   determining that the entitlement management message has not been received for a period of time; and
   disabling the conditional access device responsive to determining that the entitlement management message has not been received for a period of time.

21. The method of claim 20, further comprising:
   receiving the entitlement management message; and
   enabling the conditional access device responsive to receiving the entitlement management message.

22. The method of claim 20, wherein the determining that the entitlement management message has not been received for a period of time comprises waiting for a plurality of message windows for the entitlement management message without receiving at least one entitlement management message prior to disabling the conditional access device.

23. The method of claim 19, further comprising receiving a next message window with the entitlement management message.

24. The method of claim 19, further comprising using a random or pseudo-random algorithm to determine when the next message window is active.

25. The method of claim 19 further comprising:
   sending the message window to customer premise equipment including the consumer electronics device via a network, the message window comprising a period of time during which the headend control system will send a control message; and
   sending the control message including the entitlement management message to the customer premise equipment responsive to determining that the message window is active.

26. The method of claim 25, further comprising sending a plurality of entitlement management messages at determinate irregular intervals in accordance with a random or pseudo-random algorithm.

27. The method of claim 25, wherein the sending the message window to customer premise equipment is responsive to determining that the message window is active.

28. The method of claim 19 further comprising:
   receiving an input from a user to put the consumer electronics device in a standby mode;
   placing the consumer electronics device in standby mode by powering down the consumer electronics device responsive to receiving the input from the user, including powering down the receiver;
   receiving the first interrupt request from the conditional access device, the first interrupt request requesting that the receiver be powered up;
   powering up the receiver responsive to receiving the first interrupt request;
   receiving the second interrupt request from the conditional access device, the second interrupt request requesting that the receiver be powered down; and
   powering down the receiver responsive to receiving the second interrupt request.

29. The method of claim 28, further comprising operating the consumer electronics device at reduced power requirements while in standby mode.

30. The method of claim 28, further comprising:
   receiving a digital transport stream which includes audio/video programs; and
   decoding a tuned and decrypted audio/video signal from the conditional access device, responsive to the digital transport stream and to the consumer electronics device not being in standby mode; and
   displaying the decoded audio/video signal on a display device.

31. The method of claim 28, wherein the first interrupt request is received from the conditional access device at irregular intervals.

32. Logic encoded in one or more electronic storage media for execution to determine when a control message is to be received and when executed operable for:
   receiving at a conditional access device a control message window from a receiver in a consumer electronics device coupled to a headend control system, wherein the message window defines a time interval for expected reception of an entitlement management message;
   determining at the conditional access device when the control message window is active representing occurrence of the time interval;
   sending a wake request from the conditional access device to the consumer electronics device to activate the receiver responsive to the control message window being active; and
   sending a sleep request from the conditional access device to the consumer electronics device to deactivate the receiver responsive to the control message window being inactive representing expiration of the time interval.

33. The logic of claim 32, further operable for receiving a control message while the control message window is active.

34. The logic of claim 32, wherein there exist a plurality of control message windows spaced at irregular intervals, and the determining when the control message window is active includes using a random or pseudo-random algorithm to determine when a next control message window becomes active.

35. The logic of claim 32, further operable for:
   receiving a next control message window while a current control message window is active; and
   determining when a control message window is active responsive to the next control message window.

36. The logic of claim 32, further operable for:
   determining when a control message was received previously; and
   disabling the conditional access device responsive to when the control message was received.

37. The logic of claim 36, further operable for:
   receiving a control message; and
   enabling the conditional access device responsive to receiving the control message.

38. The logic of claim 32, further operable for disabling the conditional access device responsive to a plurality of successive control message windows passing without receiving a control message.

39. The logic of claim 32, further operable for:
   sending the control message window to customer premise equipment including the consumer electronics device via a network, the control message window comprising a period of time during which the headend control system will send a control message; and
   sending the control message including the entitlement management message to the customer premise equipment responsive to determining that the control message window is active.

40. The logic of claim 39, further operable for sending a plurality of entitlement management messages at determinate irregular intervals in accordance with a random or pseudo-random algorithm.

41. The logic of claim 39, wherein the sending the control message window to customer premise equipment is responsive to determining that the control message window is active.

42. The logic of claim 32, further operable for:
- receiving an input from a user to put the consumer electronics device in a standby mode;
- placing the consumer electronics device in standby mode by powering down the consumer electronics device responsive to receiving the input from the user, including powering down the receiver;
- receiving the wake request in the form of a first interrupt request from the conditional access device, the first interrupt request requesting that the receiver be powered up;
- powering up the receiver responsive to receiving the first interrupt request;
- receiving the sleep request in the form of a second interrupt request from the conditional access device, the second interrupt request requesting that the receiver be powered down; and
- powering down the receiver responsive to receiving the second interrupt request.

43. The logic of claim 42, further operable for operating the consumer electronics device at reduced power requirements while in standby mode.

44. The logic of claim 42, further operable for:
- receiving a digital transport stream with a decrypted audio/video program; and
- decoding a tuned and decrypted audio/video signal from the conditional access device, responsive to the digital transport stream and to the consumer electronics device not being in standby mode; and
- displaying the decoded audio/video signal on a display device.

45. The logic of claim 42, wherein the first interrupt request is received from the conditional access device at irregular intervals.

\* \* \* \* \*